US011837755B2

(12) United States Patent
Suzuki et al.

(10) Patent No.: US 11,837,755 B2
(45) Date of Patent: Dec. 5, 2023

(54) METHOD FOR PRODUCING A BATTERY (71) Applicant: PRIME PLANET ENERGY & SOLUTIONS, INC., Tokyo (JP)

(72) Inventors: Yuzo Suzuki, Kariya (JP); Takeyuki Ozaki, Seto (JP)

(73) Assignee: Prime Planet Energy & Solutions, Inc., Tokyo (JP)

( * ) Notice: Subject to any disclaimer, the term of this patent is extended or adjusted under 35 U.S.C. 154(b) by 0 days.

(21) Appl. No.: 17/468,884

(22) Filed: Sep. 8, 2021

(65) Prior Publication Data

US 2022/0181757 A1 Jun. 9, 2022

(30) Foreign Application Priority Data

Dec. 8, 2020 (JP) .................................. 2020-203503

(51) Int. Cl.
*H01M 50/627* (2021.01)
*H01M 50/103* (2021.01)
(Continued)

(52) U.S. Cl.
CPC ..... *H01M 50/627* (2021.01); *H01M 10/0585* (2013.01); *H01M 10/484* (2013.01);
(Continued)

(58) Field of Classification Search
CPC .. H01M 50/60; H01M 50/609; H01M 50/627; H01M 50/618; H01M 50/673; H01M 50/682; H01M 10/484
See application file for complete search history.

(56) References Cited

U.S. PATENT DOCUMENTS

2014/0373344 A1* 12/2014 Takada ............... H01G 9/08
29/623.5
2015/0349322 A1* 12/2015 Meissner ........... H01M 50/673
429/74
(Continued)

FOREIGN PATENT DOCUMENTS

EP 2 814 090 A1 12/2014
JP H09-102443 A 4/1997
(Continued)

*Primary Examiner* — Matthew T Martin
*Assistant Examiner* — Bartholomew A Hornsby
(74) *Attorney, Agent, or Firm* — Finnegan, Henderson, Farabow, Garrett & Dunner, LLP (57) ABSTRACT

A method for producing a battery, the method includes a liquid injecting process. In this liquid injecting process includes: a first liquid-injecting step of injecting an electrolytic solution of a first injection amount (V1) determined so that a liquid-level height of the electrolytic solution falls within an intermediate liquid-level range in which the liquid-level height is equal to or higher than a first reference height but is lower than a second reference height while an air pressure in a metal battery case is regulated to a first air pressure; and a second liquid-injecting step of injecting the electrolytic solution in a remaining second injection amount up to a specified amount while increasing the air pressure in the metal battery case to a second air pressure higher than the first air pressure and maintaining the liquid-level height of the electrolytic solution within the intermediate liquid-level range.

3 Claims, 6 Drawing Sheets

(51) Int. Cl.
   *H01M 50/618*   (2021.01)
   *H01M 10/0585*  (2010.01)
   *H01M 10/48*    (2006.01)

(52) U.S. Cl.
   CPC ....... *H01M 50/103* (2021.01); *H01M 50/618* (2021.01); *H01M 2220/20* (2013.01)

(56) References Cited

U.S. PATENT DOCUMENTS

| | | | |
|---|---|---|---|
| 2016/0268626 A1* | 9/2016 | Ishida | H01M 50/636 |
| 2017/0237108 A1* | 8/2017 | Fukatsu | H01M 50/60 29/730 |
| 2022/0149497 A1* | 5/2022 | Kawakami | H01M 50/141 |

FOREIGN PATENT DOCUMENTS

| | | |
|---|---|---|
| JP | 2012-134047 A | 7/2012 |
| JP | 2018-106816 A | 7/2018 |
| JP | 2019-145235 A | 8/2019 |
| JP | 2020-184452 A | 11/2020 |
| WO | WO 2013-118804 A1 | 8/2013 |

\* cited by examiner

METHOD FOR PRODUCING A BATTERY

CROSS-REFERENCE TO RELATED APPLICATIONS

This application is based upon and claims the benefit of priority to Japanese Patent Application No. 2020-203503 filed on Dec. 8, 2020, the entire contents of which are incorporated herein by reference.

BACKGROUND

Technical Field

The present disclosure relates to a method for producing a battery, including a liquid injecting step of injecting an electrolytic solution into a battery case.

Related Art

In producing a battery, for example, a battery is first assembled by accommodating an electrode body in a metal battery case, and then the internal air pressure of the battery case is reduced less than the atmospheric pressure and further a specified amount of an electrolytic solution is injected in the battery case through a liquid inlet provided in the battery case. Subsequently, the air pressure in the battery case is returned to the atmospheric pressure, thereby promoting impregnation of the injected electrolytic solution into the inside of the electrode body.

However, from the viewpoint of increasing the volumetric energy density of a battery, a battery case is designed with as small a size as possible, so that the empty space of the battery case around the electrode body is small. Therefore, if the injecting speed of the electrolytic solution is increased, the electrolytic solution may overflow out of the battery through the liquid inlet before the specified amount of the electrolytic solution is completely injected. To avoid such a defect, it is necessary to slowly inject the electrolytic solution according to the impregnation speed of the electrolytic solution into the electrode body. This liquid injecting time takes long and leads to low productivity of batteries.

To address the aforesaid disadvantages, Japanese patent unexamined application publication No. 2018-106816 (JP 2018-106816A) proposes the following manners (see claim 1 and others of JP 2018-106816A). Specifically, while the internal air pressure of a battery case is reduced less than the atmospheric pressure, firstly, an electrolytic solution is injected until at least part of an electrode body is immersed with the electrolytic solution. Successively, the air pressure in the battery case is increased, thereby promoting impregnation of the injected electrolytic solution into the electrode body, thus decreasing the liquid level of the electrolytic solution. Thereafter, injection of the electrolytic solution is restarted to inject a remaining amount of electrolytic solution. This manner can increase the liquid-injecting speed of the electrolytic solution in the first-time injection as compared with the foregoing method in which a specified amount of the electrolytic solution is injected at a time. Thus, the time required for the liquid injecting step can be shortened.

SUMMARY

Technical Problems

However, even in the method of JP 2018-106816A, if the liquid injecting speed of the electrolytic solution is increased in the second-time injection, the electrolytic solution may overflow out of the battery through the liquid inlet before the remaining amount of electrolytic solution is completely injected. It is thus necessary to slowly inject the electrolytic solution in accordance with the impregnation speed of the electrolytic solution into the electrode body. Alternatively, it is necessary to wait until the liquid level of electrolytic solution sufficiently decreases and then inject the remaining amount of electrolytic solution. Accordingly, the second-time injection needs a long liquid injection time. Since such a conventional liquid injecting step takes much time as mentioned above, there is room for improvement.

The present disclosure has been made to address the above problems and has a purpose to provide a method for producing a battery with a shorter time required for a liquid injecting step to inject an electrolytic solution into a battery case as compared with a conventional method.

Means of Solving the Problems

To achieve the above-mentioned purpose, one aspect of the present disclosure provides a method for producing a battery, the battery comprising: a battery case made of metal, including a liquid inlet; an electrode body accommodated in the battery case, the electrode body including an electrode opposed part in which a positive active material layer of a positive electrode sheet and a negative active material layer of a negative electrode sheet are opposed to each other; and an electrolytic solution contained in the battery case, wherein the method comprises injecting the electrolytic solution into the battery case through the liquid inlet, the injecting includes: a first liquid-injecting step of injecting the electrolytic solution of a predetermined first injection amount while air pressure in the battery case is regulated to a predetermined first air pressure, the predetermined first injection amount being determined so that a liquid-level height of the injected electrolytic solution falls within an intermediate liquid-level range in which the liquid-level height of the injected electrolytic solution is equal to or higher than a first reference height at which the whole electrode opposed part of the electrode body is immersed in the electrolytic solution but is lower than a second reference height at which the electrolytic solution reaches the liquid inlet; and a second liquid-injecting step of injecting the electrolytic solution of a second injection amount that is a remaining amount up to a specified amount while increasing the air pressure in the battery case to a second air pressure higher than the first air pressure and maintaining the liquid-level height of the electrolytic solution within the intermediate liquid-level range.

In the method of JP 2018-106816A, when the air pressure in the battery case is increased after the first liquid injection, the liquid level of the electrolytic solution excessively lowers, so that the electrode opposed part of the electrode body protrudes from the liquid surface, and thus air is likely to enter the electrode opposed part. When the liquid injection is then restarted to inject the remaining amount of electrolytic solution, the electrolytic solution is less likely to enter the electrode opposed part. It is therefore necessary to slowly inject the electrolytic solution of the remaining amount in order to avoid overflow of the electrolytic solution to the outside of the battery through the liquid inlet. Alternatively, it is necessary to wait until the liquid level of the electrolytic solution sufficiently lowers and then inject the remaining amount of electrolytic solution. Thus, the second liquid injection takes long.

In the foregoing battery producing method, in contrast, in the first liquid injection, the electrolytic solution is injected until the liquid-level height of the injected electrolytic solution falls within the intermediate liquid-level range in which the liquid-level height is equal to or higher than the foregoing first reference height but lower than the foregoing second reference height. When the air pressure in the battery case is increased in the subsequent second liquid-injecting step, the liquid-level height of the electrolytic solution is also maintained in the intermediate liquid-level range and the whole the electrode opposed part is immersed in the electrolytic solution. This can avoid the electrode opposed part from protruding out from the liquid surface and prevent air from entering in the electrode opposed part. In the second liquid-injecting step, accordingly, the remaining second injection amount of the electrolytic solution in can be injected in a short time. The above-described battery producing method can consequently shorten the time required for the liquid injecting than the conventional method described in JP 2018-106816A, and thus can enhance the productivity of batteries.

Further, in the foregoing method for producing a battery, the second liquid-injecting step may include air pressure increase to intermittently increase the air pressure in the battery case and additional liquid injection to intermittently inject the electrolytic solution, the air pressure increase and the additional liquid injection being alternately repeated.

In the above-described battery producing method, the second liquid-injecting step is configured to alternately repeat the "air pressure increase" to intermittently increase the air pressure in the battery case and the "additional liquid injection" to intermittently inject the electrolytic solution. This configuration can inject the remaining amount of electrolytic solution in a short time by simply performing the second liquid-injecting step.

Further, in the foregoing method for producing a battery, the second liquid-injecting step may include continuously injecting the electrolytic solution while continuously increasing the air pressure in the battery case.

In the above-described battery producing method, the second liquid-injecting step is configured to continuously inject the electrolytic solution while continuously increasing the air pressure in the battery case. This configuration can inject the remaining amount of electrolytic solution in a short time.

DETAILED DESCRIPTION OF THE EXEMPLARY EMBODIMENTS

First Embodiment

Figure 1:
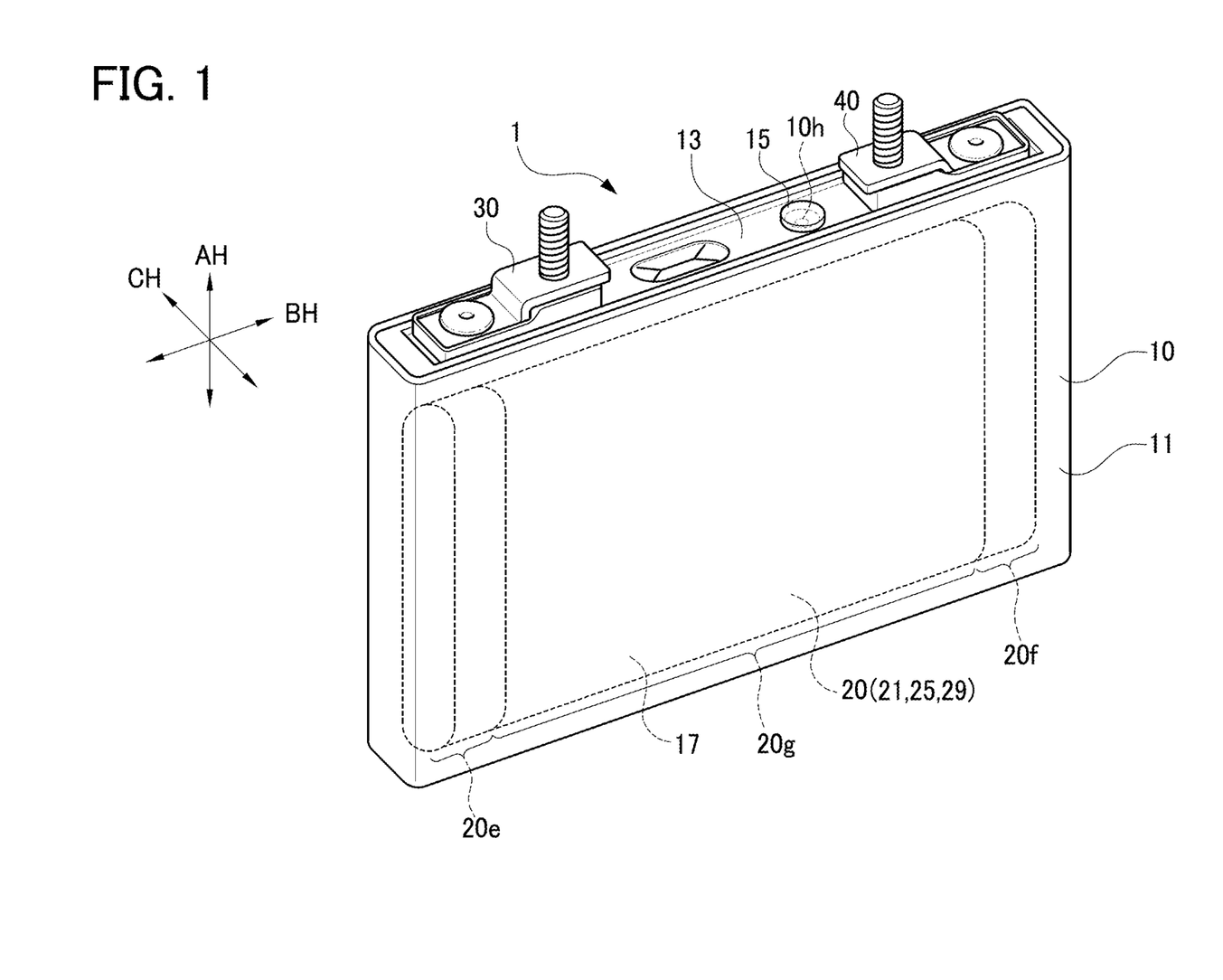
FIG. 1 is a perspective view of a battery in first and second embodiments.
Figure 2:
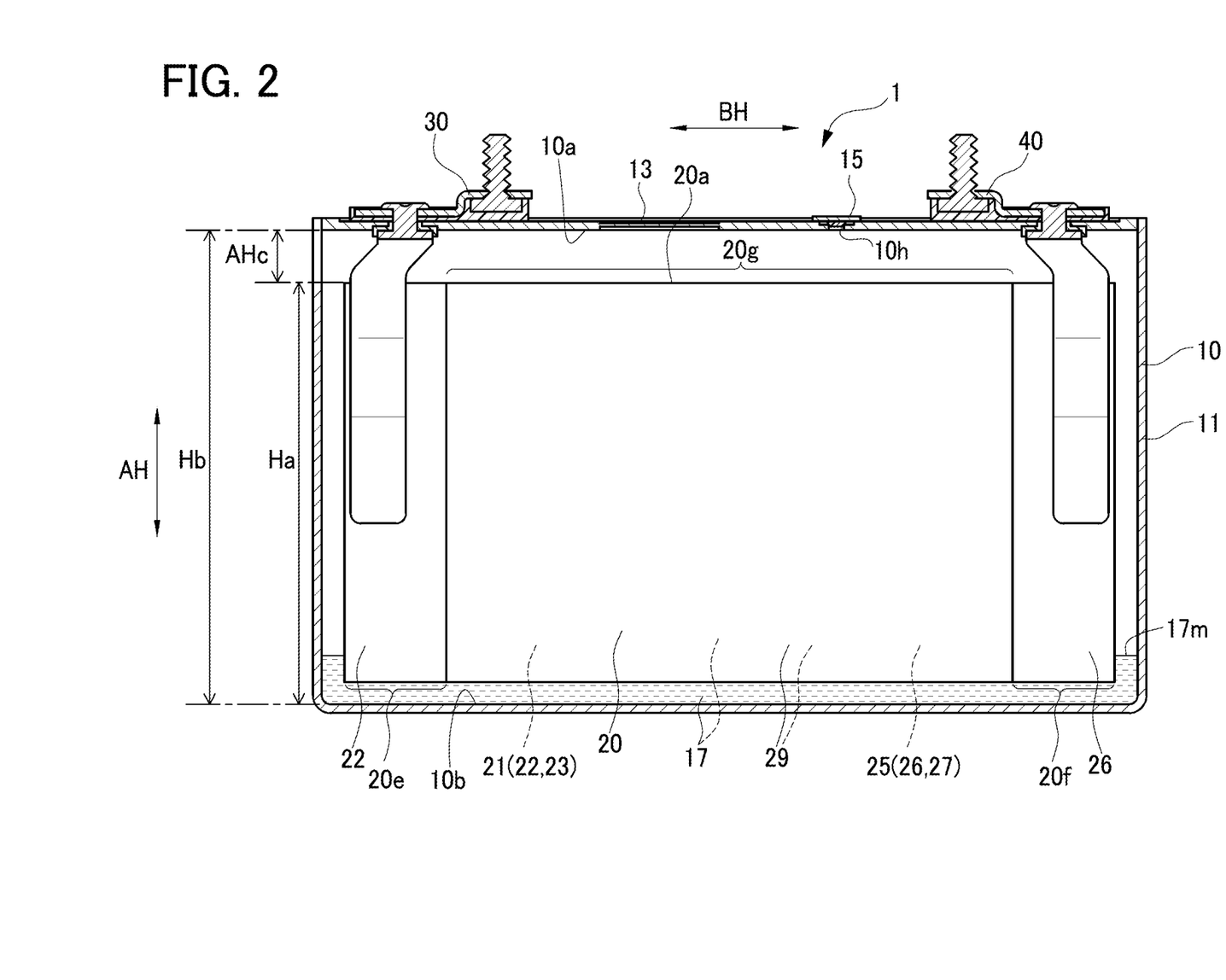
FIG. 2 is a longitudinal cross-sectional view of the battery in the first and second embodiments.

A detailed description of a first embodiment according to this disclosure will now be given referring to the accompanying drawings. FIG. 1 is a perspective view of a battery 1 and FIG. 2 is a longitudinal cross-sectional view of the battery 1 in the first embodiment. In the following description, each direction of the battery 1, that is, the longitudinal direction AH, the lateral direction BH, and the thickness direction CH, are defined as illustrated in FIG. 2. This battery 1 is a rectangular-cross-sectional and airtight lithium-ion secondary battery which is mounted in a vehicle, such as a hybrid car, plug-in hybrid case, and an electric car. The battery 1 includes a battery case 10, an electrode body 20 accommodated in this battery case 10, a positive terminal member 30 and a negative terminal member 40 supported on the battery case 10, and others. In the battery case 10, an electrolytic solution 17 is contained, a part of which permeates the electrode body 20 and the remaining electrolytic solution is accumulated on the bottom of the battery case 10.

The battery case 10 is made of metal (e.g., aluminum in the present embodiment) formed in a rectangular parallelepiped box shape, including a case body member 11 having a bottom-closed rectangular tube shape having an opening only at an upper end and a case lid member 13 having a square plate-like shape welded to the case body member 11 so as to close the opening. The case lid member 13 of the battery case 10 is provided with a liquid inlet 10h that is hermetically closed by a sealing member 15. Further, on the case lid member 13, the positive terminal member 30 and the negative terminal member 40 are fixedly-attached so as to be electrically insulated from the case lid member 13.

The electrode body 20 has a flat shape and is encased in a sideways position in the battery case 10. This electrode body 20 is configured such that a strip-shaped positive electrode sheet 21 including a strip-shaped positive current collecting foil 22 whose each principal surface is coated with a positive active material layer 23, a strip-shaped negative electrode sheet 25 including a strip-shaped negative current collecting foil 26 whose each principal surface is coated with a negative active material layer 27, and a pair of strip-shaped separators 29 are stacked one on another and wound together in a flat shape about the axis line.

The electrode body 20 includes a positive current collecting part 20e located on one side (a left side in FIGS. 1 and 2) in the lateral direction BH, a negative current collecting part 20f located on the other side (a right side in FIGS. 1 and 2) in the lateral direction BH, and an electrode opposed part 20g located between those current collecting parts 20e and 20f. The positive current collecting part 20e is a portion formed of the positive current collecting foil 22 of the positive electrode sheet 21 and wound in a flat shape. On the other hand, the negative current collecting part 20f is a portion formed of the negative current collecting foil 26 of the negative electrode sheet 25 and wound in a flat shape. The electrode opposed part 20g is a flat wound portion so that the positive active material layers 23 of the positive electrode sheet 21, formed on the positive current collecting foil 22, and the negative active material layers 27 of the negative electrode sheet 25, formed on the negative current collecting foil 26, are correspondingly opposed to each other through each separator 29.

Figure 3:
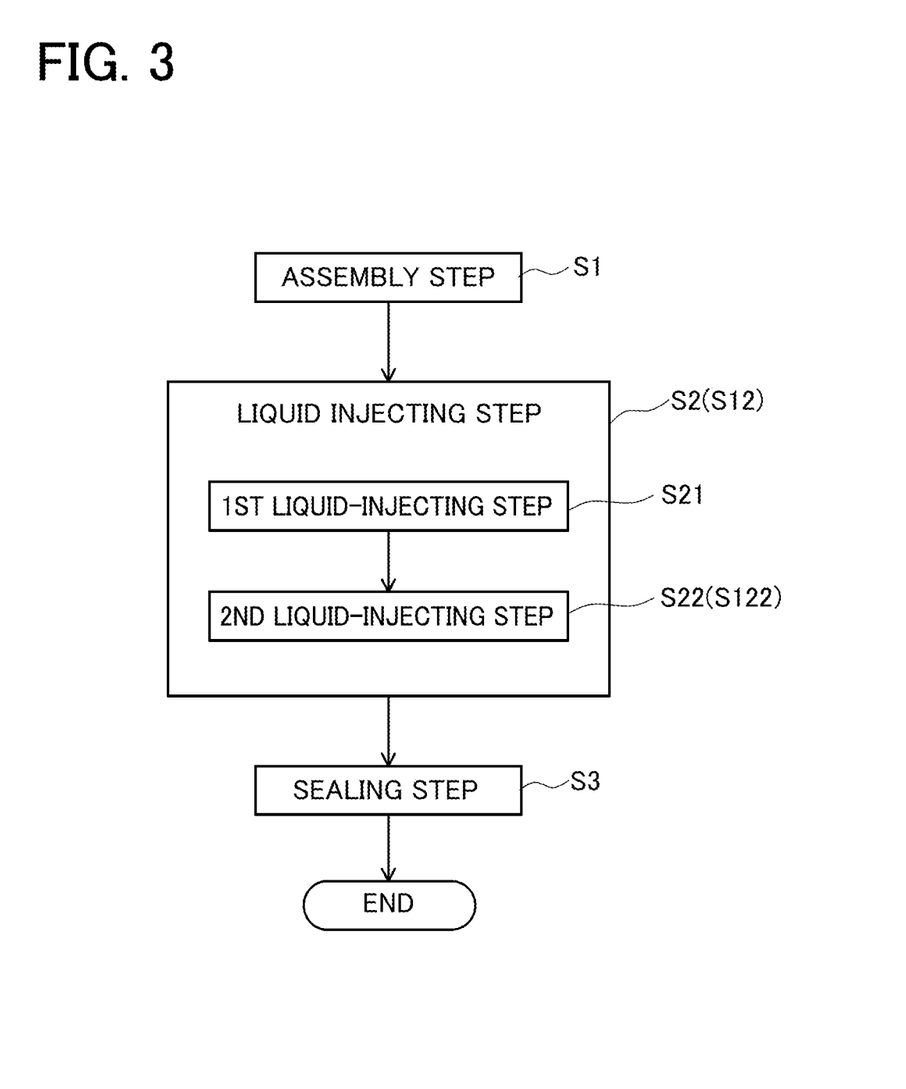
FIG. 3 is a flowchart showing a battery producing method in the first and second embodiments.

The method for producing the above-described battery 1 will be described below with reference to FIGS. 3 to 5. In an assembly step S1 (see FIG. 3), firstly, the battery 1 is assembled. Specifically, the case lid member 13 is prepared and fixedly attached with the positive terminal member 30 and negative terminal member 40 as shown in FIGS. 1 and 2. Then, the positive terminal member 30 and negative terminal member 40 are respectively welded to the positive current collecting part 20e and the negative current collecting part 20f of the electrode body 20 which are fabricated separately. Furthermore, this electrode body 20 is inserted in the case body member 11 and the opening of the case body member 11 is closed with the case lid member 13. The case body member 11 and the case lid member 13 are welded to each other to accomplish the battery case 10.

Subsequently, a liquid injecting step S2 (see FIG. 3) is performed, in which a specified amount V of the electrolytic solution 17 (e.g., 36.0 ml in the present embodiment) is injected into the battery case 10 through the liquid inlet 10h provided in the case lid member 13. This liquid injecting step S2 is carried out by use of a liquid injection device 100 shown in FIG. 4. This liquid injection device 100 includes a vacuum chamber 110 in which the battery 1 is to be placed, a liquid injection part 130 for injecting the electrolytic solution 17 into the battery case 10, a control unit 140, and others.

The vacuum chamber 110 is attached with a vacuum pump 115, a pressure regulation valve 120, and a pressure sensor 125. As an alternative, a mass flow controller may be used instead of the pressure regulation valve 120.

The liquid injection part 130 includes a cylindrical liquid injection nozzle 131 for injecting the electrolytic solution 17 into the battery case 10 and an electrolytic-solution tank 133 for storing the electrolytic solution 17 in advance. The liquid injection nozzle 131 and the electrolytic-solution tank 133 are connected to each other through a liquid flow passage 135. In some point of this liquid flow passage 135, there are placed a flow meter 137 and a liquid injection valve 139.

The control unit 140 includes a microcomputer that includes a CPU, a ROM, and a RAM, which are not shown, and operates according to a predetermined control program stored in the ROM and others. To this control unit 140, there are individually connected the vacuum pump 115, the pressure regulation valve 120, the pressure sensor 125, the flow meter 137, and the liquid injection valve 139. Based on each signal from the pressure sensor 125 and the flow meter 137, the control unit 140 controls operations of the vacuum pump 115, opening and closing of the pressure regulation valve 120, and opening and closing of the liquid injection valve 139.

Prior to the liquid injecting step S2, the battery 1 assembled as above is placed in the vacuum chamber 110, and the tip end of the liquid injection nozzle 131 is inserted in advance in the battery case 10 through the liquid inlet 10h. In a first liquid-injecting step S21 (see FIG. 3) of the liquid injecting step S2, the internal pressure of the vacuum chamber 110 is reduced from the atmospheric pressure P0 of 101 kPa to regulate the air pressure P in the vacuum chamber 110 and the battery case 10 to a predetermined first air pressure P1 (e.g., 20 kPa in the first embodiment) (see a broken-line graph in FIG. 5). Under this reduced pressure, then, a predetermined first injection amount V1 (20.0 ml in the first embodiment) of the electrolytic solution 17 is injected into the battery case 10 (see a solid-line graph in FIG. 5). The elapsed time t (seconds) in FIG. 5 means an elapsed time that passes from the start time (t=0) of reducing the internal air pressure of the vacuum chamber 110 (the battery case 10).

The first injection amount V1 of 20.0 ml is an injection amount determined so that the liquid-level height H of the electrolytic solution 17 injected in the battery case 10, which is the height of a liquid surface 17m of the electrolytic solution 17 from the bottom surface 10b of the battery case 10, can fall within an intermediate liquid-level range AHc (Ha≤H<Hb) in which the liquid-level height H is equal to or higher than the first reference height Ha at which the whole electrode opposed part 20g of the electrode body 20 is immersed in the electrolytic solution 17, but is lower than the second reference height Hb at which the electrolytic solution 17 reaches, or touches, the liquid inlet 10h (see FIG. 2).

In the first embodiment, the first reference height Ha is a distance from the bottom surface 10b of the battery case 10 to an upper end 20a of the electrode body 20; specifically, the first reference height Ha is 50 mm in the first embodiment. The second reference height Hb is a distance from the bottom surface 10b of the battery case 10 to the inner upper surface 10a (the lower surface of the case lid member 13) of the battery case 10; specifically, the second reference height Hb is 60 mm in the first embodiment. In contrast, when the electrolytic solution 17 of the first injection amount V1, i.e., 20.0 ml, is injected into the battery case 10, the liquid-level height H of the electrolytic solution 17 is about 56 mm.

Figure 4:
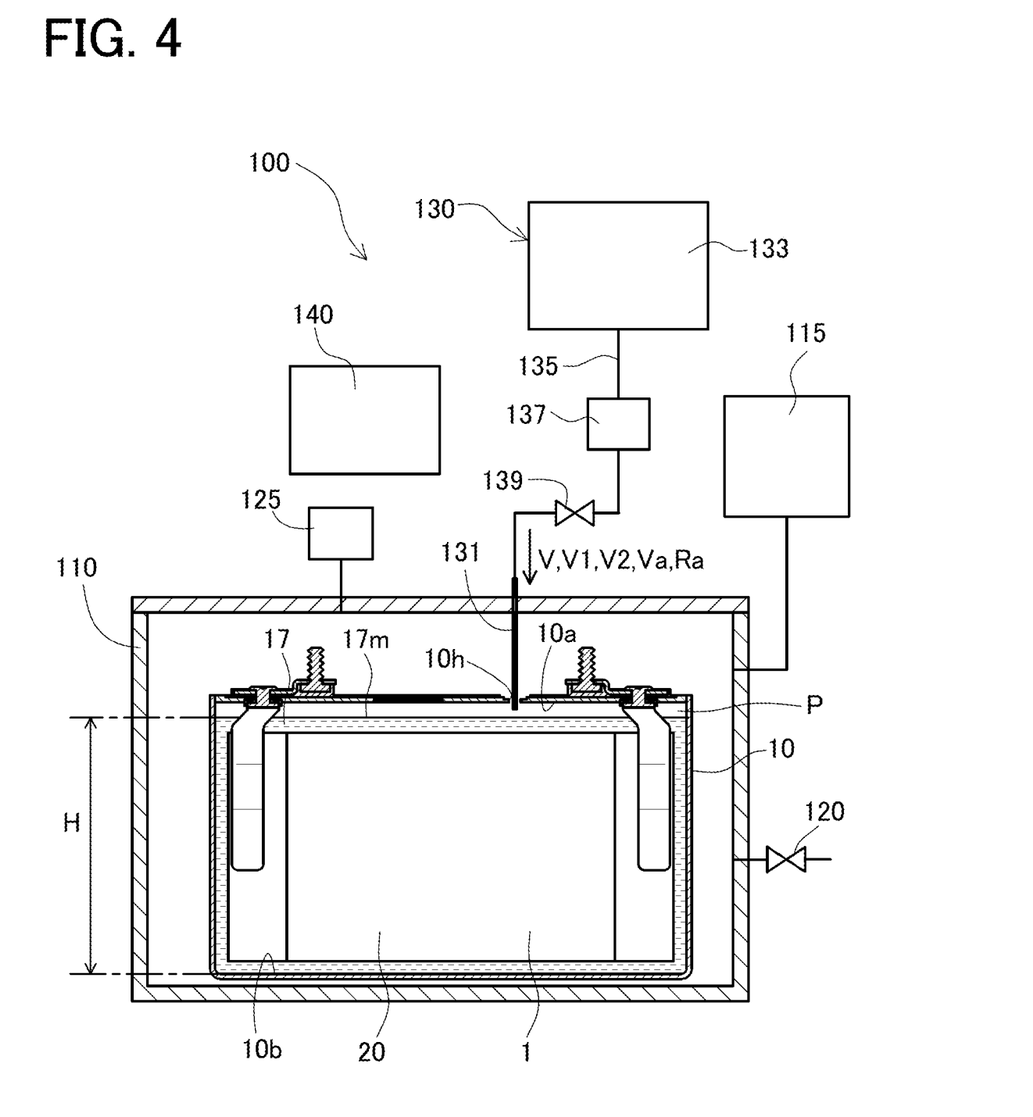
FIG. 4 is an explanatory view showing a liquid injecting step in the first and second embodiments.
Figure 5:
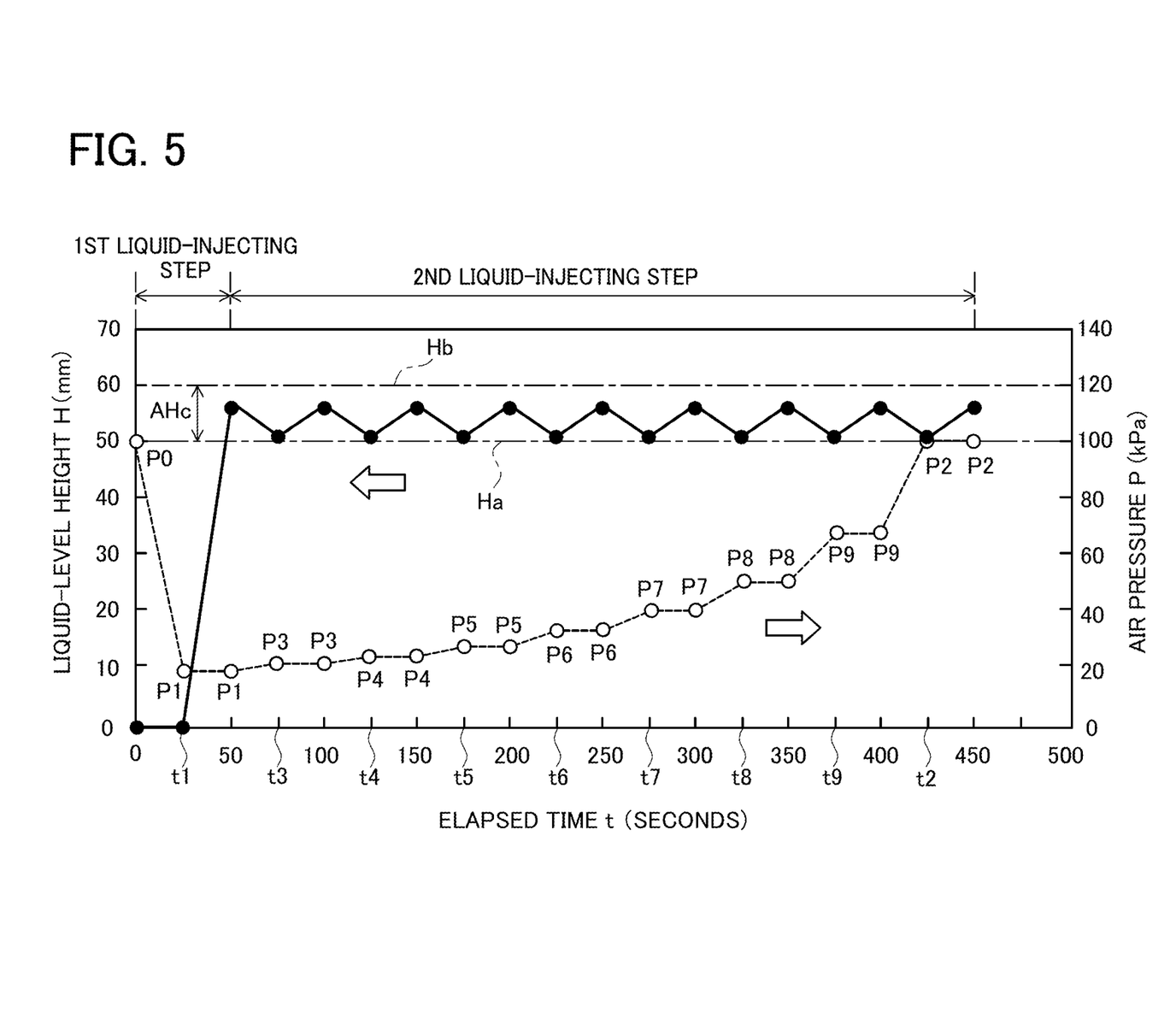
FIG. 5 is a graph related to the liquid injecting step in the first embodiment, showing a relationship between elapsed time and liquid-level height of an electrolytic solution and air pressure in a battery case.

In this first liquid-injecting step S21, specifically, the control unit 140 closes the pressure regulation valve 120 and then activates the vacuum pump 115 to reduce the internal air pressure of the vacuum chamber 110 (see FIGS. 4 and 5). When the air pressure P in the vacuum chamber 110 and the battery case 10, detected by the pressure sensor 125, decreases from the atmospheric pressure P0 of 101 kPa to the first air pressure P1 of 20 kPa, the vacuum pump 115 is stopped, the liquid injection valve 139 is opened, and injection of the electrolytic solution 17 into the battery case 10 is started at time t1. Thereafter, when the flow meter 137 detects that the electrolytic solution 17 of the first injection amount V1 of 20.0 ml is injected, the liquid injection valve 139 is closed. Thus, the liquid-level height H of the injected electrolytic solution 17 becomes a height falling within the intermediate liquid-level range AHc (50≤H<60), concretely, about 56 mm.

In a second liquid-injecting step S22 (see FIG. 3), the electrolytic solution 17 of a remaining, second injection amount V2 (=V−V1), e.g., 16.0 ml in the first embodiment, is injected up to the specified amount V of 36.0 ml while the air pressure P in the battery case 10 is increased to the second air pressure P2 (101 kPa corresponding to the atmospheric pressure P0 in the first embodiment) higher than the first air pressure P1 of 20 kPa and the liquid-level height H of the electrolytic solution 17 is maintained within the above-described intermediate liquid-level range AHc (50≤H<60).

In the first embodiment, the air pressure increase to intermittently increase the air pressure P in the battery case 10 and the additional liquid injection to intermittently inject the electrolytic solution 17 are alternately repeated. Specifically, as indicated by a broken line in FIG. 5, the air pressure P in the battery case 10 is intermittently increased in 8 stages (P1→P3→P4→P5→P6→P7→P8→P9→P2). In contrast, from each of time t3 to time t9 and time t2 at which each air pressure P3 to P9 and P2 is reached, the electrolytic solution 17 is intermittently injected by an additional injection amount Va of 2.0 ml in 8 stages.

To be specific, the control unit 140 opens the pressure regulation valve 120 to gradually increase the air pressure P in the vacuum chamber 110 and the battery case 10 from the first air pressure P1 of 20 kPa. This promotes impregnation of the injected electrolytic solution 17 into the electrode body 20, thus gradually decreasing the liquid-level height H of the electrolytic solution 17. This is because the volume VD of the air remaining in the electrode body 20 decreases in inverse proportion to the air pressure P as the air pressure P rises (Boyle's law). When the air pressure in the vacuum chamber 110 detected by the pressure sensor 125 reaches the predetermined air pressure P3 of 22.2 kPa, the pressure regulation valve 120 is closed. Accordingly, the liquid-level height H of the electrolytic solution 17 decreases by about 5 mm down to about 51 mm (within the intermediate liquid-level range AHc ($50 \leq H < 60$)) as indicated by a solid line in FIG. 5. At time t3, subsequently, the control unit 140 opens the liquid injection valve 139 again to restart injection of the electrolytic solution 17. When the flow meter 137 then detects that the electrolytic solution 17 is additionally injected by the additional injection amount Va of 2.0 ml, the liquid injection valve 139 is closed. Thus, the liquid-level height H of the electrolytic solution 17 increases again to about 56 mm.

The air pressure increase to intermittently increase the air pressure P in the battery case 10 and the additional injection to intermittently inject the electrolytic solution 17 are alternately repeated 8 times to inject the electrolytic solution 17 of the remaining second injection amount V2, 16.0 ml (=2.0 ml×8). In the liquid injecting step S2 in the first embodiment, consequently, the electrolytic solution 17 of the specified amount V, 36.0 ml, can be injected in an elapsed time t of 450 seconds.

Prior to execution of the first embodiment, it is preferable to determine the magnitude of each air pressure P3 to P9 in advance for example by investigating a relationship between the magnitude of each air pressure P3 to P9 and each additional injection amount Va of the electrolytic solution 17 in a battery identical in shape to the battery 1 while measuring the liquid-level height H by use of a liquid-level sensor or the like.

Meanwhile, even though the detailed experimental results are omitted, when the method of JP 2018-106816A is adopted instead of the liquid injecting step S2 in the first embodiment, it is found that it takes an elapsed time t of 850 seconds to inject the electrolytic solution 17 of the specified amount V of 36.0 ml to the battery 1. The first embodiment can therefore greatly reduce the time required for the liquid injecting step S2 than the method of JP 2018-106816A.

After the end of the liquid injecting step S2, the battery 1 is taken out of the vacuum chamber 110. In a sealing step S3, subsequently, the liquid inlet 10h of the battery 1 is hermetically closed with the sealing member 15 by welding. This battery 1 is then subjected to initial charge and various tests. The battery 1 is thus accomplished.

As described above, in the method for producing the battery 1, in the first liquid-injecting step S21, the electrolytic solution 17 is injected until the liquid-level height H of the electrolytic solution 17 falls within the intermediate liquid-level range AHc ($Ha \leq H < Hb$) in which the liquid-level height H is equal to or higher than the first reference height Ha but is lower than the second reference height Hb. When the air pressure P in the battery case 10 is increased in the following second liquid-injecting step S22, similarly, the liquid-level height H of the electrolytic solution 17 is maintained within the intermediate liquid-level range AHc ($Ha \leq H < Hb$) and the whole electrode opposed part 20g is immersed in the electrolytic solution 17. This can prevent the electrode opposed part 20g from protruding out from a liquid surface 17m and hence avoid entrance of air into the electrode opposed part 20g. Accordingly, in the second liquid-injecting step S22, the remaining second injection amount V2 of the electrolytic solution 17 can be injected in a short time. The method for producing the battery 1 can therefore shorten the time required for the liquid injecting step S2 than the conventional method described in JP 2018-106816A and enhance the productivity of the battery 1.

In the first embodiment, furthermore, in the second liquid-injecting step S22, the air pressure increase to intermittently increase the internal air pressure of the battery case 10 and the additional liquid injection to intermittently inject the electrolytic solution 17 are alternately repeated. This configuration can inject the remaining electrolytic solution 17 in a short time by simply performing the second liquid-injecting step S22.

Second Embodiment

A second embodiment will be described below. In the first embodiment, as described above, in the second liquid-injecting step S22 of the liquid injecting step S2, the remaining amount of the electrolytic solution 17 is injected by alternately repeating the air pressure increase to intermittently increase the internal air pressure of the battery case 10 and the additional liquid injection to intermittently inject the electrolytic solution 17. In contrast, the second embodiment differs from the first embodiment in that a second liquid-injecting step S122 (see FIG. 3) of the liquid injecting step S12 in the second embodiment is performed by continuously injecting the electrolytic solution 17 while continuously increasing the air pressure P in the battery case 10 (see FIG. 6).

In the first liquid-injecting step S21, pressure reduction and liquid injection are performed as in the first embodiment. In the second liquid-injecting step S122, from time t1b, the air pressure P in the vacuum chamber 110 and the battery case 10 is continuously increased by use of an electropneumatic regulator instead of the pressure regulation valve 120 from the first air pressure P1 of 20 kPa to the second air pressure P2 of 101 kPa corresponding to the atmospheric pressure P0 as shown by a broken line in FIG. 6 in a curve to which the inclination of a tangent line is larger as the elapsed time t is longer. On the other hand, the liquid injection valve 139 is opened and a constant additional flow rate Ra of the electrolytic solution 17 is injected into the battery case 10. Then, as indicated by a solid line in FIG. 6, the liquid-level height H of the electrolytic solution 17 is maintained at about 56 mm. This is because, as in the first embodiment, the volume VD of the air remaining in the electrode body 20 decreases in inverse proportion to the air pressure P as the air pressure P rises (Boyle's law), so that the impregnation of the electrolytic solution 17 into the electrode body 20 is promoted by just that much.

When the flow meter 137 detects that the electrolytic solution 17 of the second injection amount V2, 16.0 ml, is additionally injected, the liquid injection valve 139 is closed. In the second embodiment, therefore, the electrolytic solution 17 of the specified amount V, 36.0 ml, can be injected in an elapsed time t of 420 seconds, which is shorter than the elapsed time t of 450 seconds in the first embodiment.

Prior to execution of the second embodiment, it is preferable to obtain in advance a relationship between the change in the air pressure P and the additional flow rate Ra of the additionally-injected electrolytic solution 17, in which the liquid-level height H is substantially constant, for example by investigating the relationship between the change in each air pressure P and the additional flow rate Ra of the additionally-injected electrolytic solution 17 in a battery identical to the battery 1 while measuring the liquid-level height H by use of a liquid-level sensor or the like.

The second embodiment can also shorten the time required for the liquid injecting step S2 than the conventional method described in JP 2018-106816A, thus enabling to enhance the productivity of the battery 1. In the second embodiment, the second liquid-injecting step S122 is performed to continuously inject the electrolytic solution 17 while continuously increasing the air pressure P in the battery case 10. Thus, the remaining electrolytic solution 17 can be injected in a shorter time than in the second liquid-injecting step S22 in the first embodiment.

The present disclosure is described in the foregoing first and second embodiments but is not limited thereto. The present disclosure may be embodied in other specific forms without departing from the essential characteristics thereof.

In the first and second embodiments, for instance, the present disclosure is applied to the method for producing the battery 1 provided with a flat-shaped wound electrode body 20, but is not limited thereto. For example, the present disclosure is also applicable to a method for producing a battery provided with a laminated electrode body configured such that rectangular positive electrode sheets and rectangular negative sheets are alternately laminated in two or more layers with rectangular separators individually interposed therebetween.

In the first and second embodiments, to meet a relation of P1<P2, the first air pressure P1 is set lower than the atmospheric pressure and the second air pressure P2 is set equal to the atmospheric pressure (P2=P0), but they are not limited thereto. An alternative may be set such that the first air pressure P1 is equal to the atmospheric pressure and the second air pressure P2 is higher than the atmospheric pressure. In this case, liquid injection is performed in the first liquid-injecting step without pressure reduction and then the air pressure P is intermittently or continuously increased to the second air pressure P2 in the second liquid-injecting step.

In the first embodiment, as shown in FIG. 5, the electrolytic solution 17 is additionally intermittently injected 8 times by an additional injection amount Va of 2.0 ml at a time while the air pressure P intermittently changes (P1→P3, P4→P5→P6→P7→P8→P9→P2) so as to be gradually larger as time goes by, i.e., as the elapsed time t is longer. Further, the additional injection is carried out so that the liquid-level height H repeatedly changes within a range of about 51 mm to about 56 mm.

However, as an alternative to the first embodiment, it may be arranged to set constant the magnitude of change in the air pressure P intermittently changed while gradually decreasing the additional injection amount Va of electrolytic solution intermittently added and also gradually decreasing the change range of the liquid-level height H changed by the additional injection.

The first injection amount V1 and further the subsequent intermittent changes in air pressure P and additional injection amount Va may be determined so as to keep the liquid-level height H of the electrolytic solution 17 within the intermediate liquid-level range AHc (Ha≤H<Hb). The magnitude of increase in air pressure P intermittently caused, the magnitude of additional injection amount Va in each intermittent additional injection, and the change range of the liquid-level height H caused by the additional injections may be set different in each air pressure increase and additional liquid injection.

Figure 6:
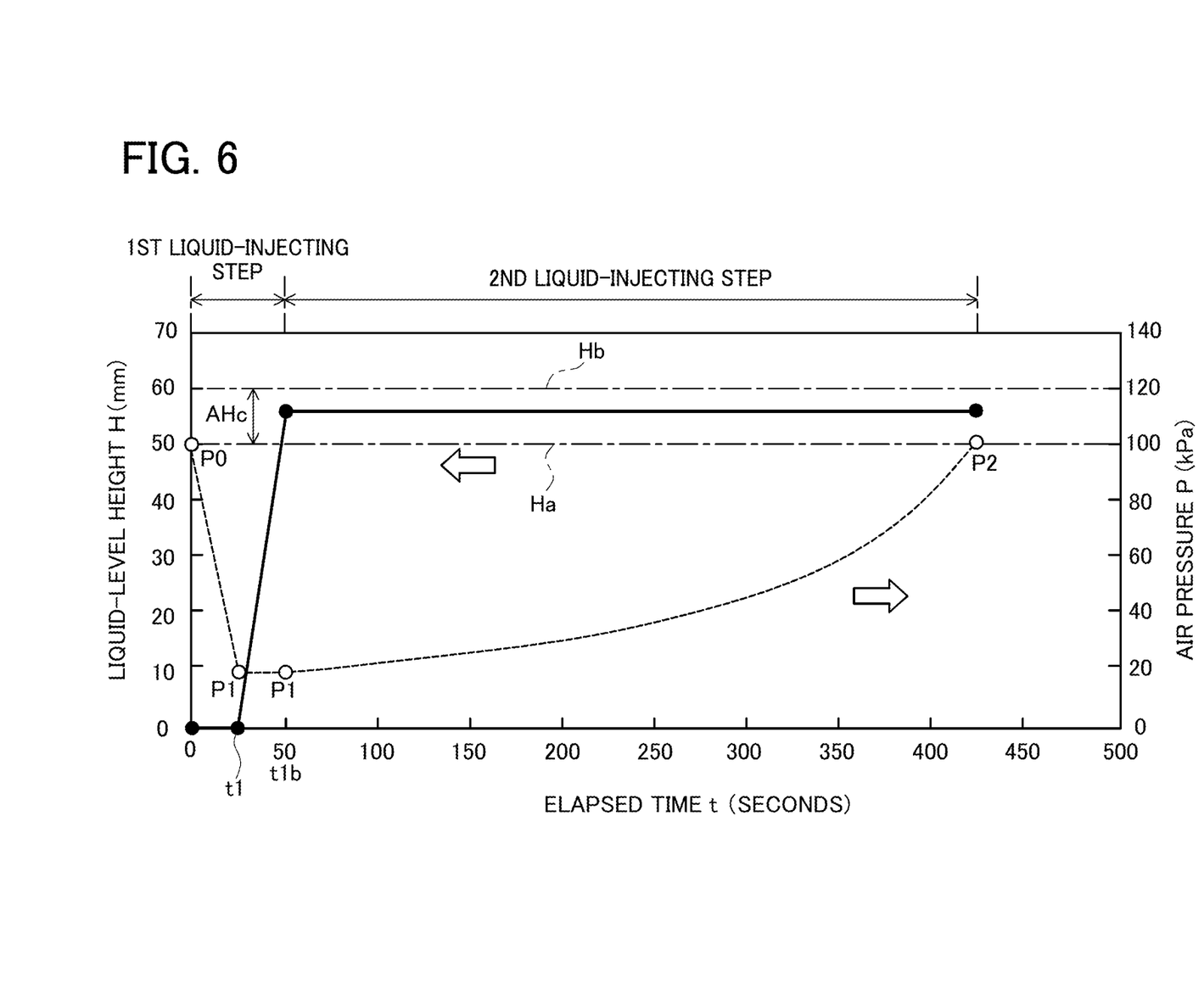
FIG. 6 is a graph related to a second liquid-injecting step in the second embodiment, showing a relationship between elapsed time and liquid-level height of an electrolytic solution and air pressure in a battery.

In the second embodiment, similarly, as shown in FIG. 6, the additional flow rate Ra of the electrolytic solution 17 in the continuous additional injection is set constant, the change in air pressure P from the first air pressure P1 to the second air pressure P2 (P1→P2) is set to be gradually larger as time goes by, i.e., as the elapsed time t is longer. The additional liquid injection is carried out so that the liquid-level height H is constant (H=about 56 mm).

However, as an alternative to the second embodiment, it may be arranged such that the magnitude of change in air pressure P is changed in an almost linear manner, while the additional flow rate Ra in the additional injection is gradually decreased and the liquid-level height H in the additional injection is constant.

Further, the first injection amount V1 and further the subsequent changes in the air pressure P and additional injection amount Va may be determined so as to keep the liquid-level height H of the electrolytic solution 17 within the intermediate liquid-level range AHc (Ha≤H<Hb). The magnitude of increase in air pressure P continuously caused, the magnitude of additional flow rate Ra in additional injection, and the liquid-level height H caused by the additional injection may be changed as the air pressure increase and the additional liquid injection progress.

Furthermore, increasing the air pressure P and additionally injecting the liquid may be appropriately combined; for example, the additional liquid injection is continuously performed while the air pressure P is continuously increased in a first stage and then the increase of the air pressure P and the additional liquid injection are intermittently alternately performed in a second, or last, stage.

REFERENCE SIGNS LIST

1 Battery
10 Battery case
10h Liquid inlet
15 Closing member
17 Electrolytic solution
20 Electrode body
20g Electrode opposed part
21 Positive electrode sheet
23 Positive active material layer
25 Negative electrode sheet
27 Negative active material layer
S1 Assembly step
S2, S12 Liquid injecting step
S21 First liquid-injecting step
S22, S122 Second liquid-injecting step
S3 Closing step
V Specified amount
V1 First injection amount
V2 Second injection amount
Va Additional injection amount
Ra Additional flow rate
P Air pressure (in Battery case)
P1 First air pressure
P2 Second air pressure
H Liquid-level height
Ha First reference height
Hb Second reference height
AHc Intermediate liquid-level range

What is claimed is:

1. A method for producing a battery, the battery comprising:
a battery case made of rigid metal, including a case lid member provided with a liquid inlet;

an electrode body accommodated in the battery case, the electrode body including an electrode opposed part in which a positive active material layer of a positive electrode sheet and a negative active material layer of a negative electrode sheet are opposed to each other; and an electrolytic solution contained in the battery case, wherein the method comprises injecting the electrolytic solution into the battery case through the liquid inlet, the injecting includes:

a first liquid-injecting step of injecting the electrolytic solution of a predetermined first injection amount while air pressure in the battery case is regulated to a predetermined first air pressure, the predetermined first injection amount being determined so that a liquid-level height of the injected electrolytic solution falls within an intermediate liquid-level range in which the liquid-level height of the injected electrolytic solution is equal to or higher than a first reference height at which the whole electrode opposed part of the electrode body is immersed in the electrolytic solution but is lower than a second reference height at which the electrolytic solution reaches the liquid inlet of the case lid member located above the electrode body; and a second liquid-injecting step of injecting the electrolytic solution of a second injection amount that is a remaining amount up to a specified amount while increasing the air pressure in the battery case to a second air pressure higher than the first air pressure and maintaining the liquid-level height of the electrolytic solution within the intermediate liquid-level range during an entirety of the second liquid-injecting step.

2. The method for producing a battery according to claim 1, wherein the second liquid-injecting step includes air pressure increase to intermittently increase the air pressure in the battery case and additional liquid injection to intermittently inject the electrolytic solution, the air pressure increase and the additional liquid injection being alternately repeated.

3. The method for producing a battery according to claim 1, wherein the second liquid-injecting step includes continuously injecting the electrolytic solution while continuously increasing the air pressure in the battery case.

* * * * *